United States Patent [19]

Eyal

[11] Patent Number: 5,976,379
[45] Date of Patent: Nov. 2, 1999

[54] METATHETIC PROCESS UTILIZING A CATION EXCHANGER

[75] Inventor: Aharon Meir Eyal, Jerusalem, Israel

[73] Assignee: Yissum Research Development Company of the Hebrew University of Jerusalem, Jerusalem, Israel

[21] Appl. No.: 09/043,912

[22] PCT Filed: Sep. 26, 1996

[86] PCT No.: PCT/GB96/02377

§ 371 Date: Jun. 2, 1998

§ 102(e) Date: Jun. 2, 1998

[87] PCT Pub. No.: WO97/13580

PCT Pub. Date: Apr. 17, 1997

[30] Foreign Application Priority Data

Oct. 11, 1995 [IL] Israel ....................................... 115565

[51] Int. Cl.$^6$ ................................................... B01D 15/04
[52] U.S. Cl. ......................... 210/638; 210/670; 210/677; 210/678; 210/681
[58] Field of Search ..................................... 210/638, 670, 210/677, 678, 681

[56] References Cited

U.S. PATENT DOCUMENTS

| 1,978,447 | 10/1934 | Austerweil et al. | 210/681 |
| 3,475,330 | 10/1969 | Gilles | 210/681 |
| 3,876,537 | 4/1975 | Dulin . | |
| 4,564,455 | 1/1986 | Flynn | 210/675 |
| 5,248,804 | 9/1993 | Nardelli | 558/147 |

FOREIGN PATENT DOCUMENTS

| 411708 | 1/1967 | Australia | 210/681 |
| 2 025 403 | 9/1970 | France | 210/681 |
| 2 612 423 | 9/1988 | France | 210/681 |
| 628 139 | 6/1933 | Germany | 210/681 |
| 612 095 | 3/1936 | Germany | 210/681 |

Primary Examiner—Ernest G. Therkorn
Attorney, Agent, or Firm—Foley & Lardner

[57] ABSTRACT

Disclosed is a metathetic process of the type M'X+M"=M'Y+M"X, where M' differs from M" and the reagents and the products are water-soluble salts, comprising the steps of (a) transferring a solution of M"Y through at least one column containing cation exchanger beads loaded with M' cations, obtained in step (b) hereinafter, whereby cation exchange takes place to form a solution of M'Y and cation exchanger beads loaded with M", and (b) transferring a solution of M'X through said column containing cation exchanger beads loaded with M" obtained in step (a) above.

9 Claims, No Drawings

METATHETIC PROCESS UTILIZING A CATION EXCHANGER

The present invention relates to metathetic processes. More particularly, the present invention relates to a metathetic process utilizing at least one cation exchange column, wherein both the reagents and the products are water-soluble salts.

Metathetic processes are internal ion exchange processes between two salts, a salt and an acid, and a salt and a base, according to the general equation:

$$M'X+M''Y=M'Y+M''X$$

wherein:
M' and M" are different cationic species, one of which could be a proton, and X and Y are different anionic species, one of which could be hydroxyl.

Many metathetic processes are known; some of them are applied in the chemical industry. A driving force is required to drive the reaction towards completion. Such driving force might result from low solubility of one of the products compared to the reagent, e.g., in the reaction:

$$Ca(NO_3)_2+K_2SO_4 \rightarrow 2KNO_3+CaSO_4$$

[*Phosphorous and Potassium*, No. 51 (January/February 1971)], or due to volatility of one of the products, e.g., in the reaction:

$$2NH_4Cl+Ca(OH)_2 \rightarrow CaCl_2+2H_2O+2NH3$$

If both products are water soluble and non-volatile, and if one of them is an acid or a base, the reaction could be driven forward by acid-base properties. That is, for example, the case when a weak acid is displaced from its salt by a strong acid, e.g., in the reaction:

$$2NH_4La+H_2SO_4 \rightarrow (NH4)_2SO_4+2HLa$$

wherein:
La is lactate.

Here, however, both products are obtained in a solution (comprising $NH_4$, $SO_4$ and HLa) and a separation means is required for receiving the products. Such separation means could be a basic binding agent that binds the displaced acid, preferably over the displacing acid.

A suitable binding agent could also provide the driving force for the reaction. One example is the displacement of a strong acid (HCl) from its salt by a weak acid (carbonic acid) in the presence of an amine-based extractant that prefers the stronger acid, as described in Israel Patents 33551 and 33552, wherein the following reaction is described:

$$NaCl+CO_2+H_2O+R_3N_{(Org)} \rightarrow R_3H^+Cl^-_{(Org)}+NaHCO_3$$

The product-binding agent interaction should be reversible in order to allow recovery of the product and for regenerating the binding agent. The needs for strong enough binding and reversibility are sometimes conflicting. Selecting or designing binding agents of suitable selectivity and binding power is relatively easy in cases where one of the products is an acid or a base, since acid-base interactions are at one's disposal. That is not the case when both products are salts.

Metathetic processes forming two water soluble salts are sometimes attainable in highly concentrated solutions, or in non-aqueous media where one of the products is soluble. Processes in alcohols [such as described in German Patent 3113612] and in concentrated ammonia solutions [U.S. Pat. No. 1,835,704] have been proposed. These processes are highly complicated, require many recycles, lead to a build-up of impurities and thereby to large bleeds and low yields, and require, in many cases, distillation of large amounts of solvent or solution components.

Processes comprising extraction of one of the salts have also been proposed [U.S. Pat. No. 3,433,584]. It is very difficult, however, to find a selective extractant for a salt as such. As a result, very complex, multi-stage processes are required.

In describing a process for separating $MgCl_2$ and $MgBr_2$ from a brine left after carnalite crystallization [Israel Patent 41225], one of the inventors, R. Blumberg, wrote [*Handbook of Solvent Extraction*, Lo, Baird and Hanson, Eds., p. 832]:

"A priori, the application of nonspecific solvents in solvent extraction for separating desired components of such essentially similar types . . . one can anticipate that separations of this type will not be straightforward; in other words, it will not be possible to achieve the desired purity of any one product in a single extraction battery, irrespective of the number of contact stages . . . . highly integrated flow that permits these separations, using six solvent extraction batteries."

Extractants comprising water immiscible amines and organic acids have been found to show higher selectivity in extraction of salts [Eyal, et al., *Ind. Eng. Chem. Res.*, Vol. 33, p. 1067 (1994)]. Operating such extractions, one encounters many difficulties. Furthermore, the extraction capacity of these extractants in extracting alkali metal salts is low.

One could consider performing a metathetic process of the type $$M'X+M''Y=M'Y+M''X$$

where M' differs from M", through a two-stage cation exchange process, as follows:

a. transferring a solution of M"Y through at least one column containing cation exchanger beads loaded with M' cations, obtained in step (b) hereinafter, whereby cation exchange takes place to form a solution of M'Y and cation exchanger beads loaded with M", and b. transferring a solution of M'X through said column containing cation exchanger beads loaded with M" obtained in step (a) above, whereby cation exchange takes place to form a solution of M"X and cation exchanger beads loaded with M'.

An example of such a process is that of $KNO_3$ production from KCl and $HNO_3$. In the first step, a solution of KCl is transferred through a cation exchange resin in its acidic form, cation exchange takes place whereby the $K^+$ is bound and HCl solution is formed. In the second step, $HNO_3$ solution is transferred through the $K^+$ loaded cation exchanger, cation exchange takes place, the resin is converted back to its acidic form, and KNO3 solution is formed [*Phosphorus and Potassium*, No. 184, p. 21 (March/April 1993)].

This process can serve as an example for the discussion of the cation exchanger property requirements. A weak acid cation exchanger (WACE) prefers protons over $K^+$ ions and will not allow an efficient replacement in the first step. In order to gain high cation exchange capacity in this step while using WACE, a large excess of KCl is required, and the solution obtained would comprise KCl+HCl mixture. Utilization of the KCl in that stream would require an additional separator. Step 1 would show high efficiency if a strong acid cation exchanger (SACE) would be used. Yet, in that case, the second step would show low cation exchange capacity and an excess of $HNO_3$ would be required. As a result, the solution obtained would comprise a $HNO_3$–$KNO_3$ mixture and would require an additional separation step to separate the product from the reagent.

According to the publication in *Phosphorus & Potassium*, a strong acid cation exchanger, Dowex C650, was chosen for the process, contacted counter-currently on a 30 column unit. KLO is introduced as 12% solution and $HNO_3$ as 15–18% solution, and product and reagent mixtures are obtained in both steps.

In the case of metathetic process between an acid and a salt, as in the above example, at least one of the steps has a clear selectivity and would not require high excess of reagent. A relatively high selectivity is also obtained in exchanging monovalent cations by divalent cations. Thus, $Ca^{2+}$ is preferred over $Na^+$ by a factor of about 2.6–3:1 (depending on the degree of cross-linking in the resin). High selectivity is also found in exchanging a low molecular weight monovalent cation with a monovalent cation of much higher molecular weight ($Ag^+$ is preferred over $NA^+$ by a factor of about 4.5:1).

Unfortunately, that is not the case in cation exchange processes involving Na+, $K^+$ and $NH_4^+$. According to most sources, the sequence of preference is $K^+>NH_4+>Na^+$, but the selectivities are less. $NH_4^+$ is preferred over $Na^+$ by a factor of about 1.2:1, and $K^+$ is preferred over $Na^+$ by a factor of about 1.35:1. Thus, in metathetic processes between salts of sodium, potassium and ammonium, high excesses of reagents are required to obtain economic cation exchange capacities and product and reagent mixtures are formed. Compared with acid and salt metathetic processes, separation between the product and reagent is usually much more difficult in the case of salt-salt metathetic processes.

It has now been found that a significant improvement is reached on conducting the process with two types of cation exchangers, wherein one (A) is more acidic than the other (B) and wherein, in step (a) the solution of M"Y is first transferred through beads of cation exchanger A and then through beads of cation exchanger B, both of which are loaded with M' cations obtained in step (b), whereby cation exchange takes place on both cation exchangers to form a solution of M'Y and to form cation exchanger beads loaded with M"; and in step (b), the solution of M'X is first transferred through beads of cation exchanger B and then through beads of cation exchanger A, both of which are loaded with M" cations obtained in step (a), whereby cation exchange takes place on both cation exchangers to form a solution of M"X and to form cation exchanger beads loaded with M'.

In this way, the amount of excessive reagent required to reach a particular overall cation exchange capacity of the resin is significantly reduced and the cost of product separation from the excess of the reagent is reduced proportionately.

Thus, according to the present invention, there is now provided a metathetic process of the type

M'X+M"Y=M'Y+M"X where M' differs from M" and the reagents and the products are water-soluble salts, comprising the steps of (a) transferring a solution of M"Y through at least one column containing cation exchanger beads loaded with M' cations, obtained in step (b) hereinafter, whereby cation exchange takes place to form a solution of M'Y and cation exchanger beads loaded with M", and (b) transferring a solution of M'X through said series of columns containing cation exchanger beads loaded with M" obtained in step (a) above, whereby cation exchange takes place to form a solution of M"X and cation exchanger beads loaded with M'; characterized in that both M' and M" are selected from the group consisting of sodium, potassium and ammonium; X and Y are different anions; two types of cation exchanger, A and B, are used in the process; cation exchanger A is more acidic than cation exchanger B; in step (a), the solution of M"Y is first transferred through beads of cation exchanger A and then through beads of cation exchanger B, both of which are loaded with M' cations obtained in step (b) hereinafter, whereby cation exchange takes place on both cation exchangers to form a solution of M'Y and to form cation exchanger beads loaded with M"; and in step (b), the solution of M'X is first transferred through beads of cation exchanger B and then through beads of cation exchanger A, both of which are loaded with M" cations obtained in step (a) above, whereby cation exchange takes place on both cation exchangers to form a solution of M"X and to form cation exchanger beads loaded with M'.

In preferred embodiments of the present invention, M"X is more acidic than M'Y.

Preferably, in the process of the present invention, Y is a carbonate or a bicarbonate and X is the anion of a mineral salt.

Especially preferred is the use of the present invention wherein M" is an ammoniumm ion.

In a most preferred embodiment of the present invention, cation exchanger A carries sulfonic groups and cation exchanger B carries carboxylate groups, and steps (a) and (b) are conducted countercurrently on a series of columns.

As stated above, the process is particularly advantageous when one of the product salts is more acidic than the other. In that case, in the step forming the more acidic salt, the reagent solution should be first transferred through the less acidic cation exchanger and then through the more acidic one. In the step forming the less acidic salt, the reagent solution is transferred in the opposite direction.

The relative acidity of the salt, as is very well known, is determined by its cation, its anion, or both. As ammonium is the cation of a relatively weak base, its salts are more acidic than those of sodium or potassium, if the anions in both cases are those of acids of similar strength. Similarly, if the cations are of bases of similar basicity (e.g., sodium and potassium) the acidity of the salt would be determined by the acidity of the acid comprising the anion. Thus, ammonium halides are more acidic than sodium or potassium halides, and sodium, potassium and ammonium carbonates, bicarbonates or carboxylates are more basic than sodium and potassium halides or nitrates. The relative acidity of salts is easily compared by the pH of their equivalent-concentration solutions.

The most common strong acid cation exchangers carry a sulfonate functional group. The weak and cation exchangers are usually carboxylates. Phenolic and phosphoric ones are found, too. The relative acidity sequence is:

$RSO_3H$(pK<1)>$RPO_3H$(pK=2–3)>RCOOH (pK=4–6)

The resin matrix could also affect the acidity of the cation exchanger. The pKa of methacrylic type WACE is about 6, and that of acrylic type is about 5.3.

The beads of the two types of cation exchangers are not mixed. They can be arranged in two layers in the same column, or in different columns, so that the solution of the reagent salt transfers first through one of them and then through the other.

The process is preferably conducted countercurrently on a series of columns. An example for such an operation is the ISEP unit of Advanced Separation Technologies, Inc., a description of which can be found in the publication by Rossiter and Talbert, "Recovery of Amino Acids and Carboxylic Acids by Continuous Exchange," presented at the AICHE conference, November, 1991. In such a unit, modified according to the present invention, part of the columns contain one type of cation exchanger, and the rest of them the other cation exchanger.

In the case of ammonium salts, there is more freedom in affecting the ion exchange by adding it in an excess in the operation, where it should replace another cation. The excess is removed relatively easily by distillation. An excess of ammonium carbonate could also be removed by thermal decomposition and removal of gaseous ammonia and $CO_2$. Yet, as explained above, the invention avoids the need for high excess.

Examples of suitable sulfonic acid carrying cation exchangers are Dow's XUS 40406 and Dowex® MSC-1; Rohm & Haas' Amberlite® 200C, IR 120, 122, 132 and 252; Purolite's® C-100, 120, 141, 150 and 160 and Mitsubishi's Diaion® SK and PK series. Suitable carboxylate carrying cation exchangers are Rohm & Haas' Duolite® C470; IRC 50, 76 and 86; Purolite's® C105, 106, 107 and 115 and Mitsubishi's Diaion® WK 10, 11 and 20. The resins could be of gel type or (macro) porous type with styrene, methacrylic or acrylic polymeric matrix, with various degrees of cross-linking.

The product salts could be recovered from the solutions compriusing them by known means, e.g., crystallization by water evaporation and/or cooling. For that purpose, they are preferably obtained at as high a concentration as possible. The concentration of the product solution is determined by the concentration of the reagents, by the solubility of the product, and by other parameters well-known to those versed in the art of ion exchange, including the thermal and mechanical stability of the resin, the viscosity of the solutions, some unavoidable dilution due to the need to sweeten off between the stages and the recycles required to avoid losses, etc.

In cases where M"Y is ammonium carbonate or bicarbonate, and where M"Y is recovered by evaporative crystallization, the excess of M"Y is preferably removed as $NH_3$ and $CO_2$ vapors. Cooling the vapors reforms the reagent. Similarly, $CO_2$ is removed from a solution of bicarbonate in order to transfer it to the carbonate salt.

In some metathetic processes, the main product of interest is M'Y, while M"X is a by-product. In these cases, M"X can be of commercial value and can be used in a solution form or after separation. Alternatively, M"X could be converted to M"Y. In a preferred embodiment of the process, M"X is reacted with at least one reagent to reform M"Y, which is then reused in step (a) of the process.

According to one of the preferred embodiments M" is ammonium ion, and in that case, M"X is an ammonium salt. The solution comprising M"X obtained in step (b) can be reacted with an auxiliary base at conditions in which the ammonia is displaced from the solution to the vapor phase. Suitable auxiliary bases include NaOH, $Mg(OH)_2$ and CaO. The solution obtained after ammonia displacement can have a value of its own (e.g., $MgCl_2$ can be thermally hydrolysed to $Mg(OH)_2$ or MgO and HCl). The liberated ammonia can be reacted with the acid or with salts of Y, to reform M"Y.

According to another preferred embodiment, Y is carbonate or bicarbonate. In this embodiment, M"Y can be formed from $CO_2$. In a most preferred embodiment, M" is ammonium, Y is carbonate, X is chloride and M"Y is reformed similarly to the corresponding stages of the Solvay process. $CaCO_3$ is thermally decomposed to CaO and $CO_2$. The CaO is reacted with the M"X ($NH_4Cl$) solution to liberate the ammonia that is reacted with the $CO_2$, to reform M"Y [$(NH_4)_2CO_3$].

It will be evident to those skilled in the art that the invention is not limited to the details of the foregoing illustrative discussion, and that the present invention may be embodied in other specific forms without departing from the essential attributes thereof, and it is therefore desired that the present embodiments be considered in all respects as illustrative and not restrictive, reference being made to the appended claims rather than to the foregoing description, and all changes which come within the meaning and range of equivalency of the claims are therefore intended to be embraced therein.

What is claimed is:

1. A metathetic process of the type $$M'X+M''Y=M'Y+M''X$$

where M' differs from M" and the reagents and the products are water-soluble salts, comprising the steps of:

a) transferring a solution of M"Y through at least one column containing cation exchanger beads loaded with M' cations, obtained in step (b) hereinafter, whereby cation exchange takes place to form a solution of M'Y and cation exchanger beads loaded with M", and b) transferring a solution of M'X through said column containing cation exchanger beads loaded with M" obtained in step (a) above, whereby cation exchange takes place to form a solution of M"X and cation exchanger beads loaded with M':

characterized in that:

both M' and M" are selected from the group consisting of sodium, potassium and ammonium:

X and Y are different anions;

two types of cation exchanger, A and B, are used in the process; cation exchanger A is more acidic than cation exchanger B when both are in acid form;

in step (a). the solution of M"Y is first transferred through beads of cation exchanger A and then through beads of cation exchanger B, both of which are loaded with M' cations obtained in step (b), whereby cation exchange takes place on both cation exchangers to form a solution of M'Y and to form cation exchanger beads loaded with M"; and in step (b), the solution of M'X is first transferred through beads of cation exchanger B and then through beads of cation exchanger A, both of which are loaded with M" cations obtained in step (a), whereby cation exchange takes place on both cation exchangers to form a solution of M"X and to form cation exchanger beads loaded with M'.

2. The process as claimed in claim 1, wherein M"X is more acidic than M'Y.

3. The process as claimed in claim 2, wherein Y is a carbonate or a bicarbonate.

4. The process as claimed in claim 2, wherein X is the anion of a mineral salt.

5. The process as claimed in claim 2, wherein M" is ammonium ion.

6. The process as claimed in claim 2, wherein cation exchanger A carries sulfonic groups.

7. The process as claimed in claim 2, wherein cation exchanger B carries carboxylate groups.

8. The process as claimed in claim 2, wherein steps (a) and (b) are conducted counter-currently on a series of columns.

9. The process as claimed in claim 1, in which M"X is reacted with at least one reagent, to reform M"Y.

* * * * *